Patented Aug. 3, 1926.

1,594,865

UNITED STATES PATENT OFFICE.

ARTHUR ZITSCHER, OF OFFENBACH-ON-THE-MAIN, GERMANY, ASSIGNOR TO I. G. FARBENINDUSTRIE AKTIENGESELLSCHAFT, OF FRANKFORT-ON-THE-MAIN, GERMANY.

AZO DYES DERIVED FROM MONOACYLACETYL BODIES AND PROCESS OF MAKING SAME.

No Drawing. Application filed May 25, 1923, Serial No. 641,510, and in Germany November 11, 1922.

My invention relates to new azo dyestuffs, insoluble in water, of the general formula:

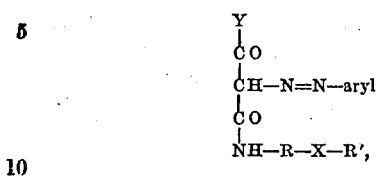

wherein Y means any radicle of the hydrocarbon series containing at least one and not more than six carbon atoms, R an aryl residue, R an aromatic residue, and X an azo or azoxy group. Under the term "an aromatic residue" for R' I include a carbo- or heterocyclic aromatic resideu, substituted or not, as well the residue of an acyclic body, containing an acid methylene group, such as derivatives of the β-keton-aldehyde, e. g. acetylaceton, derivatives of the acetoacetic acid and the like.

The dyestuffs are when dry yellow to brown powders, insoluble in water and soluble in sulfuric acid to a yellow to violet solution.

They can be used for the production of valuable pigment colors and give, when produced on the fiber, yellow to brown shades of a singular fastness to washing.

The new products are obtained by combining diazo-, tetrazo- or diazoazocompounds, not containing a sulfonic or carboxylic group, with the corresponding acylacetylamino azo- or -azoxybodies.

As diazocomponents I may use in this process those of anilin, its homologues and substitution products, such as toluidins, anisidins, chloro- and nitroanilins, chloro- and nitrotoluidins, chloro- and nitroanisidins, naphthylamins, aminoanthraquinones, aminoazocompounds, diaminobases such as dianisidin, dichlorobenzidin, diaminodiphenylether, diamino-azo- and -azoxycompounds and others.

The acylacetyl-aminoazo- and -azoxybodies, not known hitherto, can be prepared by heating aminoazo- or -azoxycompounds containing only one aminogroup, with acylacetic acid esters preferably in the presence of a solvent or diluent.

Among the aminoazo and aminoazoxy compounds suitable for the purpose of my present invention I may mention—aminoazobenzene and -toluene, aminoazoxybenzene, the chlorinated and nitrated aminoazobenzenes, aminophenylazonaphthalene, benzeneazonaphthylamin, also aminoazocompounds, which can be obtained by combining diazotized mono acyldiamins or nitroamins respectively of the aromatic series with e. g. phenols or with bodies containing a methylene group, capable of combining, such as pyrazolones, derivatives of β-ketonaldehyde, e. g. acetylacetone, derivatives of the acetoacetic acid and the like, and by subsequently saponifying or reducing respectively the products obtained.

The following examples illustrate the invention, the parts being by weight.

*Example 1.*

25,5 parts of ortho-chloroanilin are diazotized in the usual manner and the diazosolution is added to a solution of 64.5 parts of acetoacetyl-4-amino-4'-chloroazobenzene in aqueous alkali, to which is added a sufficient quantity of sodium acetate. When the combination is complete, the dyestuff is filtered, well washed and ground to a paste. Mixed with the usual substrata it forms a yellow lake of a very good fastness.

The dyestuff thus produced probably has the formula:

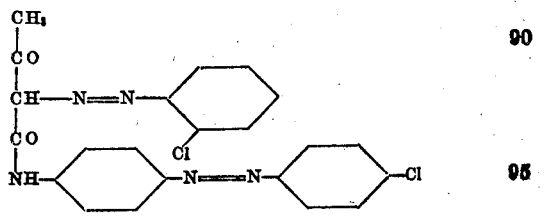

Production of the dyestuffs on the fiber.

*Example 2.*

The yarn, having been well boiled and dried, is impregnated with a solution of 10 gr. of acetoacetyl-4-aminoazobenzene or 10 gr. of acetoacetyl-4-amino-3'-nitroazobenzene, 15 cc. of caustic soda solution of 34° Bé. and 20 cc. of Turkey red oil in the liter, well wrung out and without being dried, developed in a diazosolution, containing 3 gr. of 5-nitro-1.2-toluidin in the liter, to which is added sodium acetate.

In this manner I obtain with acetoacetyl-4-aminoazobenzene yellow, with acetoacetyl-4-amino-3'-nitroazobenzene reddish yellow clear tints of a very good fastness.

*Example 3.*

The yarn having been well boiled and dried, is impregnated with a solution of 10 gr. of acetoacetyl-4'-aminobenzene-azo-1-phenyl-3-methyl-5-pyrazolon or 10 gr. of acetoacetyl-4'-aminobenzene-azo-para-cresol, 15 cc. of caustic soda solution of 34° Bé and 20 cc. of Turkey red oil in the liter, well wrung out and, without being dried, developed in a diazo solution, containing 3 gr. of 5-chloro-1.2-toluidin in the liter, to which is added sodium acetate.

With acetoacetyl-4'-aminobenzene-azo-1-phenyl-3-methyl-5-pyrazolon clear orange yellow, with acetoacetyl-4'-aminobenzene-azo-para-cresol yellow tints of a very good fastness are obtained. The dyestuff produced with acetoacetyl-4'-aminobenzene-azo-1-phenyl-3-methyl-5-pyrazolon probably has the formula:

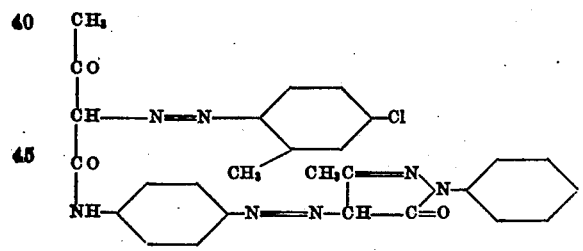

By an aftertreatment with copper or chrome salts the tints are obtained more brown and the fastness is increased.

The new dyestuffs can be produced by printing a diazosolution upon a padded fabric according to the usual method, also according to the method of nitrosamin printing.

In the same manner the process may be conducted with other diazocompounds and other corresponding acyl-acetyl-aminoazo- or -azoxybodies, e. g. with benzoylacetic acid derivatives.

The following table gives some of the shades of a number of dyestuffs, prepared according to the present process:

| Diazocompound from— | Combined with— | Shades. |
|---|---|---|
| Ortho-chloro-anilin | Acetoacetyl-4-aminoazobenzene. | Yellow. |
| 5-chloro-1.2-toluidin | ---do--- | Yellow. |
| 5-nitro-1.2-toluidin | Acetoacetyl-4-aminoazobenzene (example 2). | Yellow. |
| 4-nitro-1-naphthylamin | Acetoacetyl-4-aminoazobenzene. | Olive-yellow. |
| Ortho-aminoazotoluene | ---do--- | Orange. |
| α-aminoanthraquinone | ---do--- | Orange-yellow. |
| Dianisidin | ---do--- | Yellowish brown. |
| Ortho-aminophenylether | Acetoacetyl-4-aminoazoxybenzene. | Greenish yellow. |
| 5-nitro-1.2-toluidin | ---do--- | Lemon-yellow. |
| 3-nitro-1.4-toluidin | ---do--- | Yellow. |
| β-aminoanthraquinone | ---do--- | Orange-yellow. |
| Ortho-chloro-anilin | Acetoacetyl-4-amino-4'-chloro-azobenzene (example 1). | Yellow. |
| 2.5-dichloroanilin | Acetoacetyl-4-amino-4'-chloro-azobenzene. | Yellow |
| 4-chloro-1.2-toluidin | ---do--- | Yellow. |
| Ortho-nitroanilin | ---do--- | Yellow. |
| 5-nitro-1.2-toluidin | ---do--- | Yellow. |
| Ortho-aminoazotoluene | ---do--- | Orange. |
| β-aminoanthraquinone | ---do--- | Orange-yellow. |
| Ortho-chloroanilin | Acetoacetyl-4-amino-3'-nitro-azobenzene. | Yellow. |
| 2.5-dichloroanilin | ---do--- | Yellow. |
| 4-chloro-1.2-toluidin | ---do--- | Yellow. |
| Ortho-nitroanilin | ---do--- | Yellow. |
| 5-nitro-1.2-toluidin | Acetoacetyl-4-amino-3'-nitro-azobenzene (example 2). | Reddish yellow. |
| Ortho-aminoazotoluene | Acetoacetyl-4-amino-3'-nitro-azobenzene. | Orange. |
| α-aminoanthraquinone | ---do--- | Orange-yellow. |
| Para-toluidin | Acetoacetyl-ortho-aminoazotoluene. | Yellow. |
| Ortho-chloroanilin | ---do--- | Yellow. |
| 4-chloro-1.3-toluidin | ---do--- | Yellow. |
| 4-chloro-1.2-anisidin | ---do--- | Yellow. |
| Ortho-nitroanilin | ---do--- | Reddish yellow. |
| 5-nitro-1.2-toluidin | ---do--- | Reddish yellow. |
| 4-nitro-1-naphthylamin | ---do--- | Brownish olive-yellow. |
| Meta-aminoazotoluene | ---do--- | Olive-yellow. |
| β-aminoanthraquinone | ---do--- | Orange-yellow. |
| Ortho-chloroanilin | Acetoacetyl-4-amino-1-phenylazo-naphthalene. | Reddish yellow. |
| 4-chloro-1.3-toluidin | ---do--- | Reddish yellow. |
| 4-chloro-2-nitroanilin | ---do--- | Yellowish orange. |
| 5-nitro-1.2-toluidin | ---do--- | Orange-yellow. |
| Meta-aminoazotoluene | ---do--- | Orange. |
| Ortho-phenetol-azo-α-naphthylamin. | ---do--- | Red. |
| Ortho-aminophenylether | Acetoacetyl-4'-amino-2'-methyl-phenyl-azo-1-naphthalene. | Yellow. |
| 6-chloro-1.2-toluidin | ---do--- | Yellow. |
| Ortho-nitroanilin | ---do--- | Reddish yellow. |
| Ortho-chloroanilin | Acetoacetyl-4'-aminobenzene-azo-3-methyl-1-phenyl-5-pyrazolon. | Reddish yellow. |
| 2.5-dichloroanilin | ---do--- | Reddish yellow. |
| 2-chloro-4-nitroanilin | ---do--- | Orange. |
| Ortho-nitroanilin | ---do--- | Reddish yellow. |
| 5-chloro-1.2-toluidin | Acetoacetyl-4'-aminobenzene-azo-3-methyl-1-phenyl-5-pyrazolon (example 3). | Orange-yellow. |
| 4-nitro-1.2-anisidin | Acetoacetyl-4'-aminobenzene-azo-3-methyl-1-phenyl-5-pyrazolon. | Orange-yellow. |
| 5-nitro-1.2-toluidin | ---do--- | Orange. |
| 4-nitro-1-naphthylamin | ---do--- | Yellowish brown. |
| Ortho-aminoazotoluene | ---do--- | Brownish orange. |
| Ortho-chloroanilin | Acetoacetyl-4'-aminobenzene-azo-para-cresol. | Yellow. |
| 2.5-dichloroanilin | ---do--- | Yellow. |
| 5-nitro-1.2-toluidin | ---do--- | Reddish yellow. |
| 5-chloro-1.2-toluidin | Acetoacetyl-4'-aminobenzene-azo-para-cresol (example 3). | Yellow. |
| Ortho-aminoazotoluene | Acetoacetyl-4'-aminobenzene-azo-para-cresol. | Orange. |
| α-aminoanthraquinone | ---do--- | Brownish orange. |

When a diazocompound of dianisidin is combined with acetoacetyl-4-aminoazobenzene, the resulting dyestuff probably has the formula:

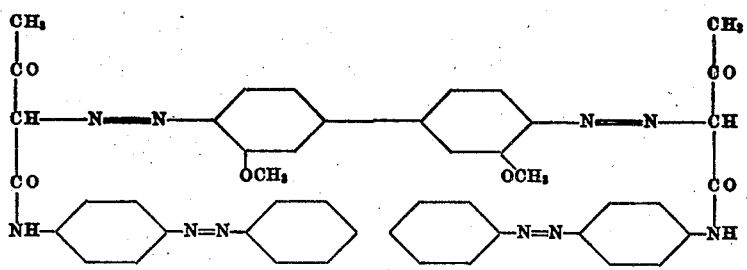

When a diazocompound of β-aminoanthraquinone is combined with acetoacetyl-4-aminoazoxybenzene, the resulting dyestuff probably has the formula:

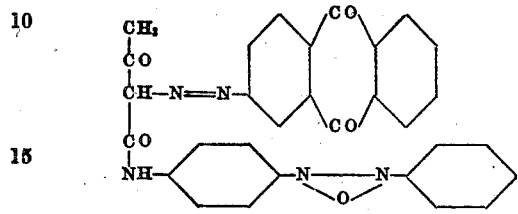

When a diazocompound of meta-aminoazotoluene is combined with acetoacetyl-4-amino-1-phenyl-azonaphthalin, the resulting dyestuff probably has the formula:

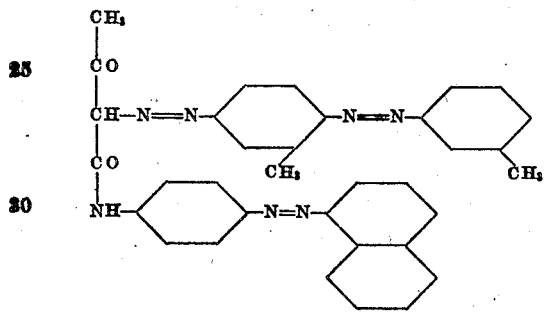

When a diazocompound of ortho-aminophenylether is combined with acetoacetyl-4'-amino-2'-methyl-phenyl-azo-1-naphthalin, the resulting dyestuff probably has the formula:

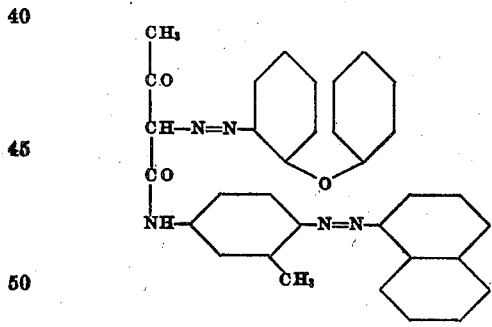

When a diazocompound of 4-nitro-1-naphthylamin is combined with acetoacetyl-4'-aminobenzene-azo-3-methyl-1-phenyl-5-pyrazolon, the resulting dyestuff probably has the formula:

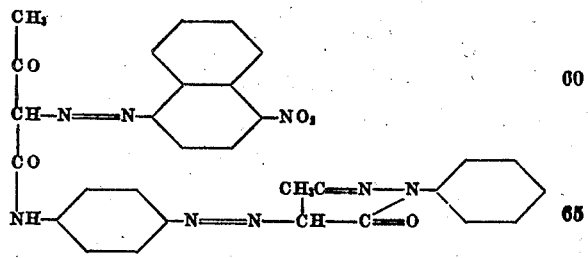

Now what I claim and desire to secure by Letters Patent is the following:

1. As new products the azodyestuffs, insoluble in water, of the general formula:

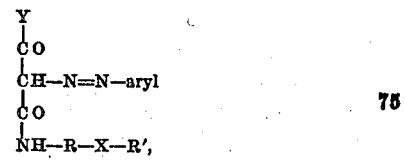

wherein Y means any radicle of the hydrocarbon series containing at least one and not more than six carbon atoms, R an aryl residue, R' an aromatic residue, and X an azo or azoxy group, which are, when dry, yellow to brown powders, insoluble in water and soluble in sulfuric acid to a yellow to violet solution, said dyestuffs yielding valuable pigment colors and, when produced on the fiber, yellow to brown shades of a singular fastness to washing.

2. A process of making azodyestuffs, insoluble in water, consisting in combining diazocompounds not containing a sulfonic or carboxylic group with monoacylacetylbodies of the general formula:

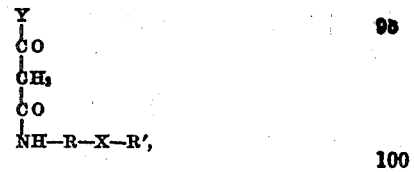

wherein Y means any radicle of the hydrocarbon series containing at least one and not more than six carbon atoms R an aryl residue, R' an aromatic residue and X an azo or azoxy group.

3. Textile material dyed with one of the new azodyestuffs as covered in claim 1, said dyestuff being developed on the material.

4. As new products the azodyestuffs, insoluble in water, of the general formula:

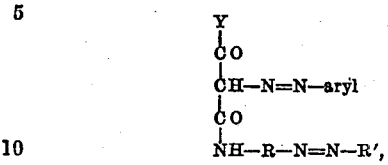

wherein Y means any radicle of the hydrocarbon series containing at least one and not more than six carbon atoms, R an aryl residue and R' an aromatic residue, which are, when dry, yellow to brown powders, insoluble in water and soluble in sulfuric acid to a yellow to violet solution, said dyestuffs yielding valuable pigment colors and, when produced on the fiber, yellow to brown shades of a singular fastness to washing.

5. A process of making azodyestuffs, insoluble in water, consisting in combining diazocompounds not containing a sulfonic or carboxylic group with monoacylacetylbodies of the general formula:

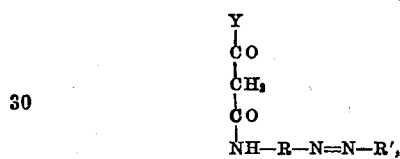

wherein Y means any radicle of the hydrocarbon series containing at least one and not more than six carbon atoms, R an aryl residue and R' an aromatic residue.

6. Textile material dyed with one of the new azodyestuffs as covered in claim 4, said dyestuff being developed on the material.

7. As new products the azodyestuffs, insoluble in water, of the general formula:

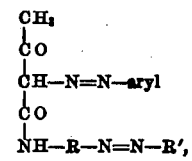

wherein R means an aryl residue and R' an aromatic residue, which are, when dry, yellow to brown powders, insoluble in water and soluble in sulfuric acid to a yellow to violet solution, said dyestuffs yielding valuable pigment colors and, when produced on the fiber, yellow to brown shades of a singular fastness to washing.

8. A process of making azodyestuffs, insoluble in water, consisting in combining diazocompounds, not containing a sulfonic or carboxylic group, with monoacetoacetyl-bodies of the general formula:

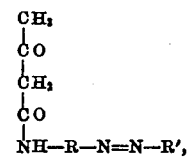

wherein R means an aryl residue and R' an aromatic residue.

9. Textile material dyed with one of the new azodyestuffs as covered in claim 7, said dyestuff being developed on the material.

In testimony, that I claim the foregoing as my invention, I have signed my name, this 9th day of May 1923.

ARTHUR ZITSCHER. [L. S.]